US009185853B1

(12) United States Patent
Ascherman et al.

(10) Patent No.: US 9,185,853 B1
(45) Date of Patent: Nov. 17, 2015

(54) DOUBLE-WALLED NESTED PLANT POT ASSEMBLY FOR HYDROPONIC IRRIGATION SYSTEM

(71) Applicant: SENTINEL GLOBAL PRODUCT SOLUTIONS, INC., Santa Rosa, CA (US)

(72) Inventors: R. Kurt Ascherman, Glen Ellen, CA (US); Gregory J. Moore, Santa Rosa, CA (US)

(73) Assignee: SENTINEL GLOBAL PRODUCT SOLUTIONS, INC., Santa Rosa, CA (US)

( * ) Notice: Subject to any disclaimer, the term of this patent is extended or adjusted under 35 U.S.C. 154(b) by 183 days.

(21) Appl. No.: 13/890,507

(22) Filed: May 9, 2013

Related U.S. Application Data

(60) Provisional application No. 61/644,991, filed on May 9, 2012.

(51) Int. Cl.
  *A01G 9/02* (2006.01)
  *A01G 31/02* (2006.01)
(52) U.S. Cl.
  CPC . *A01G 9/02* (2013.01); *A01G 31/02* (2013.01)
(58) Field of Classification Search
  CPC .................................. A01G 9/02; A01G 31/02
  USPC ............................ 47/62 R, 62 N, 66.7, 75, 86
  See application file for complete search history.

(56) References Cited

U.S. PATENT DOCUMENTS

| 603,492 | A | * | 5/1898 | Waterer | 47/65.6 |
|---|---|---|---|---|---|
| 2,741,875 | A | * | 4/1956 | Van Staalduinen | 47/75 |
| 3,243,919 | A | * | 4/1966 | Carlson | 47/79 |
| 3,800,471 | A | * | 4/1974 | Adams | 47/79 |
| 4,216,623 | A | * | 8/1980 | Silver | 47/80 |
| 4,557,070 | A | * | 12/1985 | Oyama | 47/80 |
| 4,991,345 | A | * | 2/1991 | Bloch | 47/79 |
| 5,852,896 | A | * | 12/1998 | Flasch, Jr. | 47/79 |
| 6,516,563 | B1 | * | 2/2003 | Matthews | 47/66.1 |
| 2014/0083009 | A1 | * | 3/2014 | Panopoulos et al. | 47/62 R |

* cited by examiner

*Primary Examiner* — Rob Swiatek
*Assistant Examiner* — Ebony Evans
(74) *Attorney, Agent, or Firm* — Craig M. Stainbrook; Stainbrook & Stainbrook, LLP

(57) ABSTRACT

A double-walled nested plant pot assembly having a base pot and an insert pot, the latter removably inserted into the base pot. The base pot has a bottom and tapering sides, an open top, a drain hole in the bottom, and legs on the bottom for elevating the base pot above a surface. Clearance holes are provided for plumbing to be disposed under the base pot bottom. A pipe fitting is disposed in the drain hole for connection with a drain line. Stand offs are formed in the base pot for supporting the insert pot. The shape of the insert pot conforms to the base pot with slightly smaller dimensions and includes a basin portion with a plurality of drain slots. When placed on the stand offs, the spaces between the basin portion, the insert bottom, and the interior sides and bottom of the base pot provide a volume through which water may drain from the insert pot into the base pot and through the base pot drain.

7 Claims, 7 Drawing Sheets

DOUBLE-WALLED NESTED PLANT POT ASSEMBLY FOR HYDROPONIC IRRIGATION SYSTEM

CROSS REFERENCES TO RELATED APPLICATIONS

The present application claims the benefit of the filing date of U.S. Provisional Patent Application Ser. No. 61/644,991, filed May 9, 2012 (May 9, 2012).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

SEQUENCE LISTING

Not applicable.

BACKGROUND OF THE INVENTION

1. Field of the Invention

The present invention relates generally to agricultural and horticultural plant pots, and more particularly to plant pots employed in hydroponic plant growing systems, and still more particularly to a two-part separable double-walled nested hydroponic plant pot having an outside pot with a water inlet/outlet and basin drain in fluid communication with a subsoil irrigation/fertilization system.

2. Background Discussion

It is well-known to grow plants using hydrocultural growing techniques—"hydroponics." The systems and apparatus employed in hydroponics obviate the need for soils, conserve on water use, restrict chemical or other pollutants into the environment, facilitate harvesting, and ultimately result in superior plant specimens. It is also well known to use either sub-irrigation or top irrigation systems to water hydroponically grown plants, and to use either static or continuous flow irrigation for either type, as well as ebb-and-flow or flood-and-drain irrigation. The instant invention falls broadly into the top irrigation flood-and-drain type irrigation system, using a improved set of nested pots.

BRIEF SUMMARY OF THE INVENTION

The present invention provides apparatus for a hydroponic irrigation system using a two-part separable double-walled nested hydroponic plant pot system including an outside (female) base pot with a water outlet and basin drain in fluid communication with a sub-irrigation/fertilization drain and supply system, and an inside (male) insert pot insertably nested within the interior volume of the female pot and supported above the bottom of the base pot by a plurality of stand offs. The male (insert) pot includes a plurality of slots and/or drain holes disposed around the outer walls and in the bottom of the insert pot. Accordingly, a growing medium and/or soil or a combination of the two can be placed in the insert pot and a plant start placed and rooted in the soil. Irrigation can be supplied either by overhead drip line and allowed to drain from the insert into the base pot, where it drains through the basin drain and through pipe and filters into a water supply and circulation system, or it can be provided from a source in fluid communication with the base pot so as to introduce water and nutrients in the space surrounding the insert pot, where it will migrate through the slots and drain holes and come into contact with the growing medium and plant roots. The fluid circulated may be provided with plant nutrients and fertilizer and can be circulated and then recirculated through the irrigation system. The cycling of water and nutrients may be repeated using a first volume of water until that volume is nutritionally exhausted or otherwise chemically unsuited for use in growing the plant, at which time a new volume of fresh water and nutrients may be introduced.

It is thus a principal object of the present invention to provide a new and improved nested double-walled hydroponic grow pot for use with a large number of similar pots on a ganged irrigation system.

It is another object of the present invention to provide a new and improved hydroponic grow pot that when used in a ganged system may be selectively spaced closely or far apart in relation to other pots, thereby providing means to adjust spacing according to plant needs.

A further object or feature of the present invention is a new double-walled nested plant pot that allows the insert pot to be swapped out for another insert pot containing a different plant or plant start.

An even further object of the present invention is to provide a novel double-walled nested plant pot combination suitable for use in a multi-pot irrigation system.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
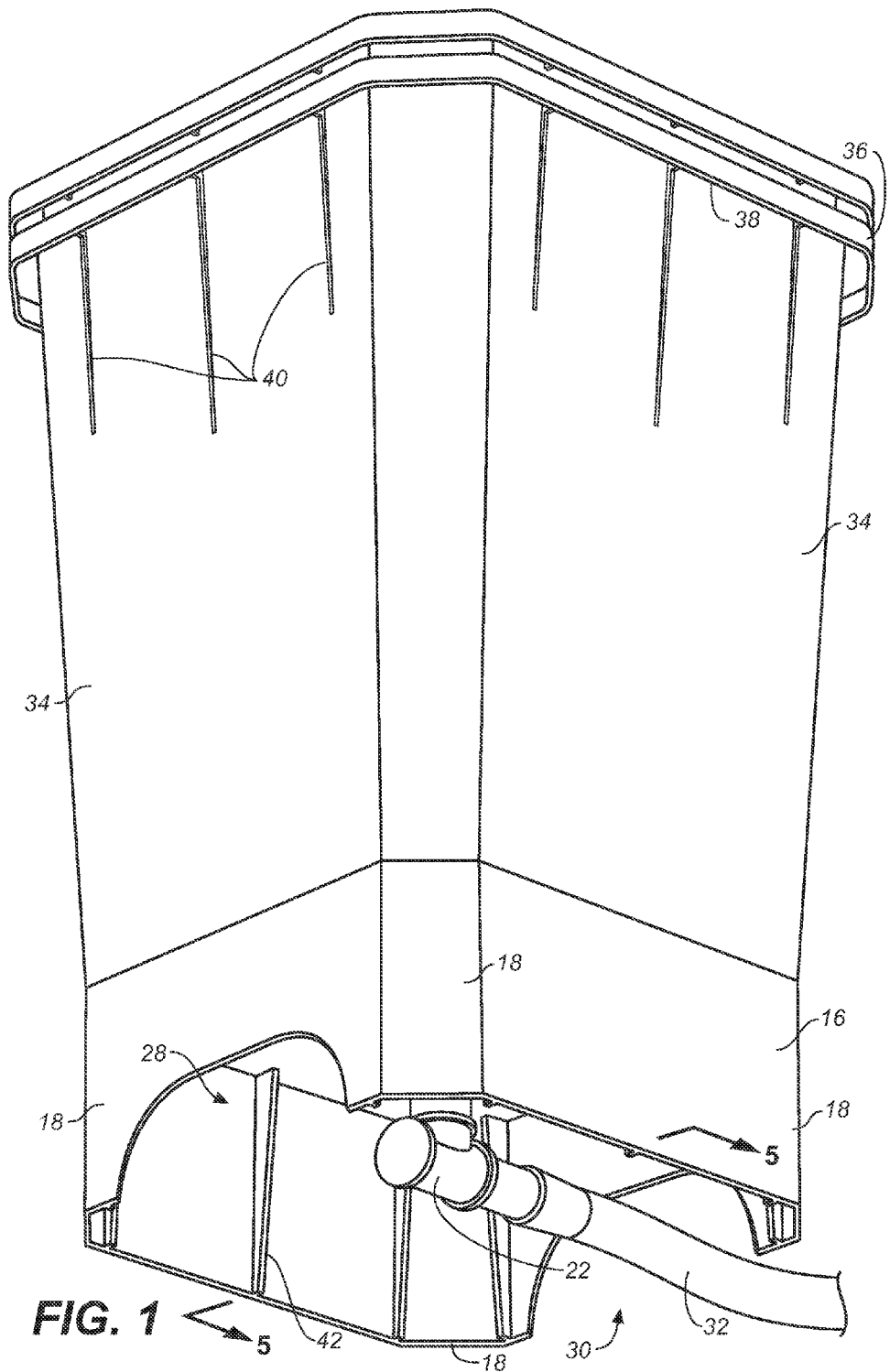
FIG. 1 is lower right front perspective view of the double-waled nested plant pot assembly of the present invention.
Figure 2:
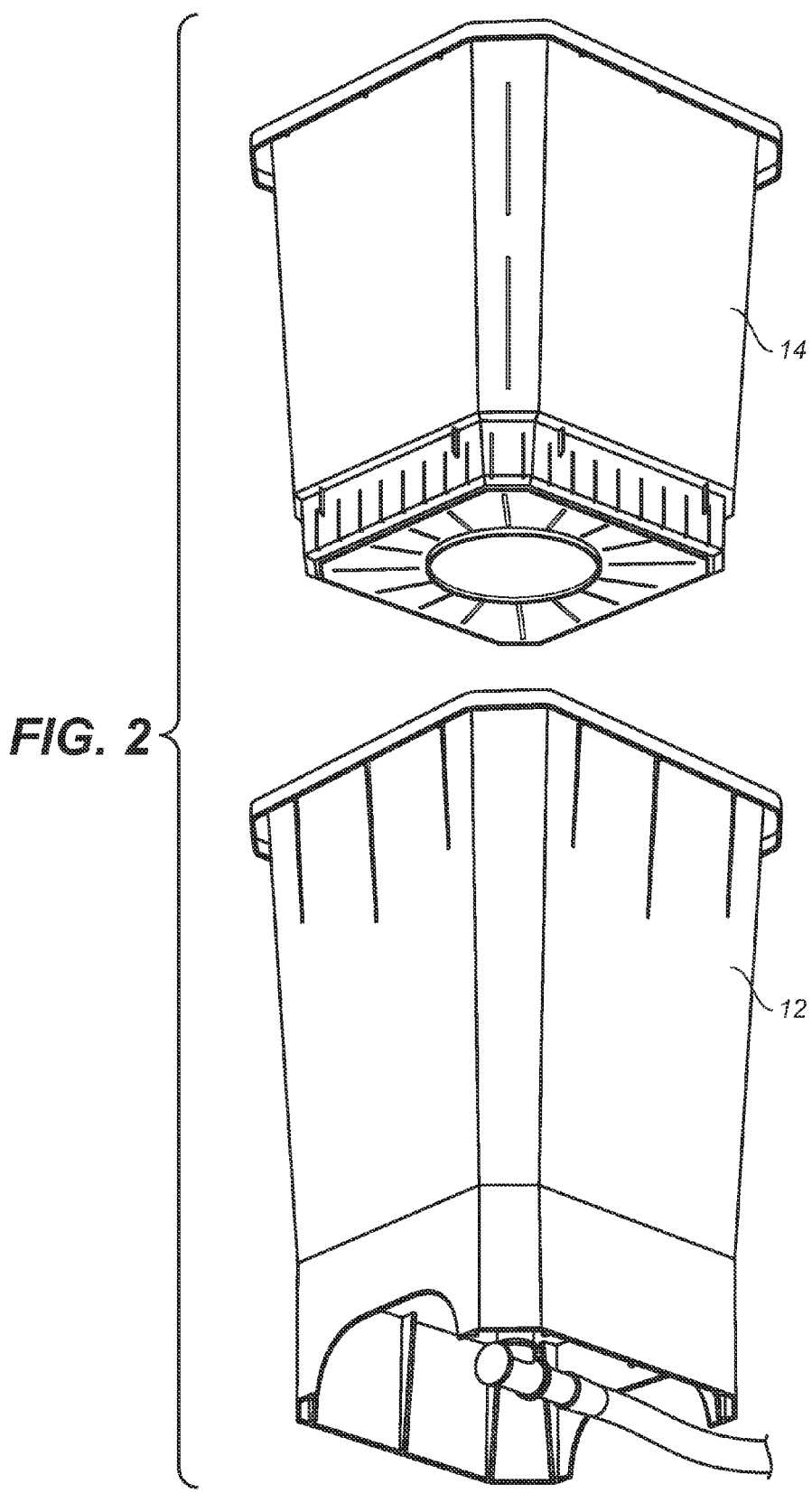
FIG. 2 is a partially exploded view thereof, showing the insert (male) pot separated from the base (female) pot.
Figure 4:
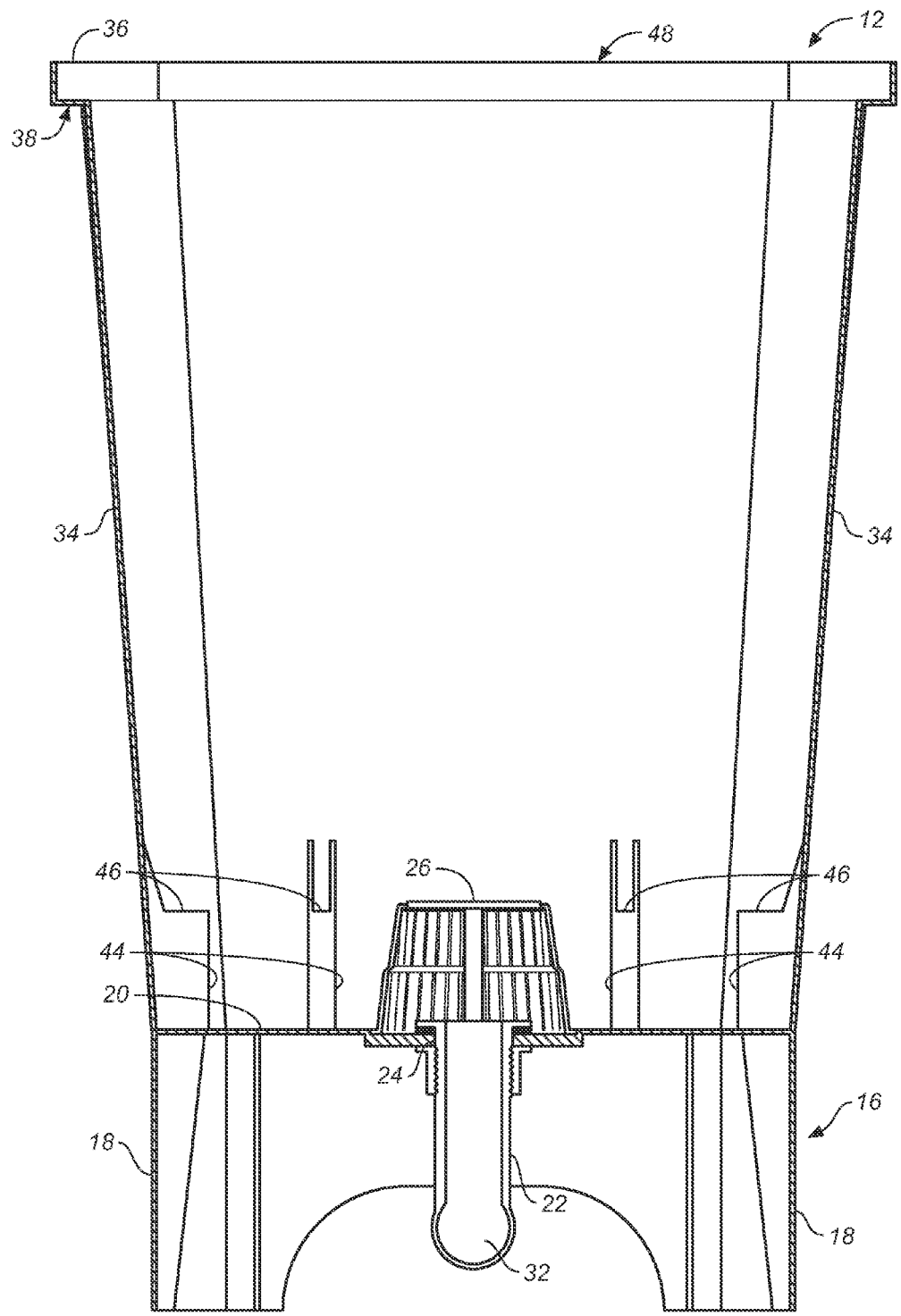
FIG. 4 is a cross-sectional rear view in elevation of the base pot and connected drain line taken along section line 4-4 of FIG. 7.

Referring first to FIGS. 1 and 2, wherein like reference numerals refer to like components in the various views, there is illustrated therein a new and improved double-walled nested plant pot assembly, generally denominated 10 herein. Referring still to FIGS. 1 and 2, and now also to FIGS. 4 and 7, the assembly includes a base (female) pot 12 and an insert (male) pot 14, each preferably fabricated from molded plastic. The base pot includes a support base 16 with integrally formed corner feet 18 which elevate the bottom 20 of the base pot above a planar surface on which it is placed (a floor or the ground). A connector Tee 22 is disposed in a drain hole 24 generally centered in the bottom of the base pot. An inverted conical basket strainer 26 covers the drain hole.

Front and back clearances 28, 30 are provided between the feet 18 so as to facilitate connection of the connector Tee to a drain line 32.

Figure 7:
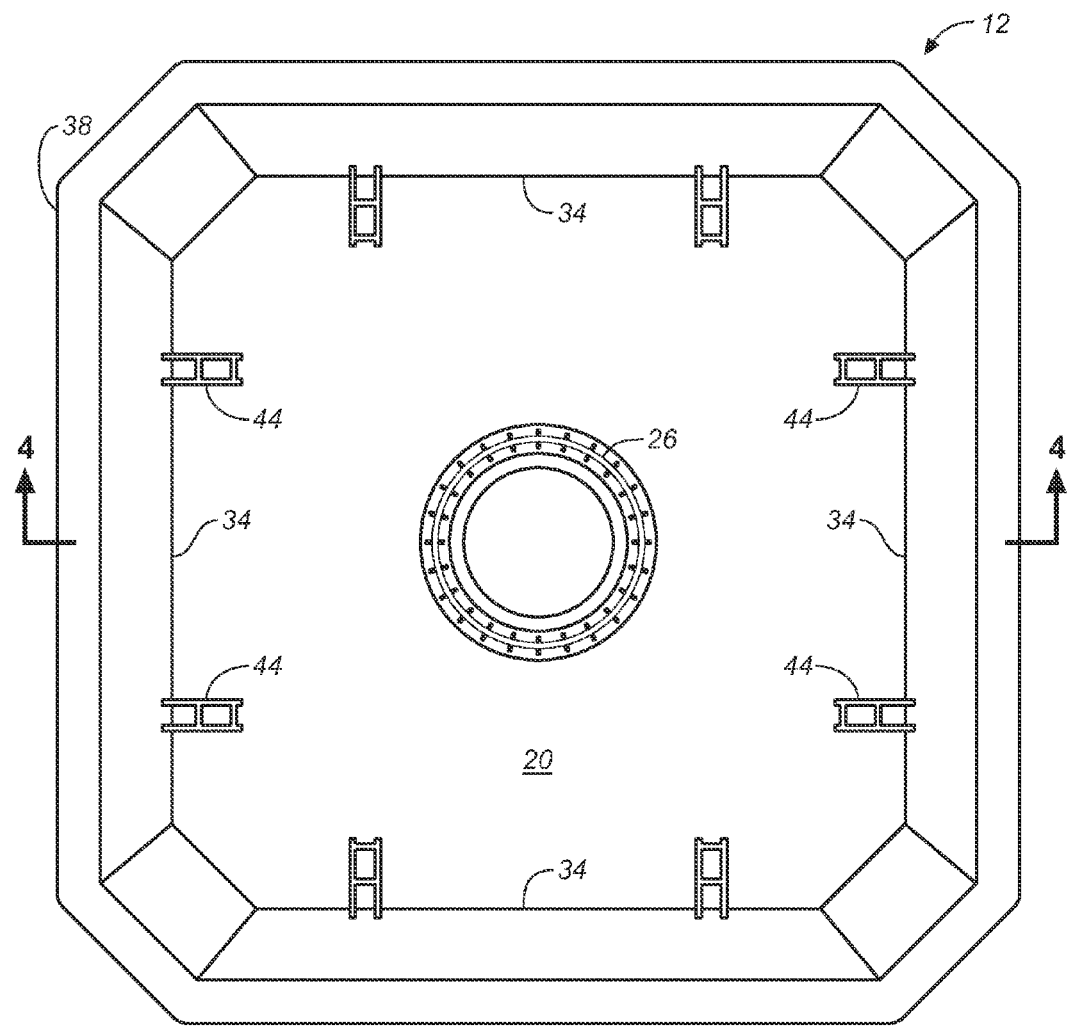
FIG. 7 is a top plan view of the base pot.

The sides 34 of the base pot are slightly tapered and configured in a generally square shape when viewed from above (see FIG. 7). Truncated corners, however, may be provided to enhance the strength of the pot and to facilitate handling. The upper rim 36 of the base pot includes a curled edge 38 for gripping and carrying. Reinforcing ribs 40, 42 may be provided under the curled edge and under the bottom, respectively to enhance the structural integrity of the thin-walled lightweight material.

Disposed along the bottom 20 of the base pot are a plurality of spaced apart stand offs 44 with substantially co-planar shelves 46 for supporting the insert (male) pot 14 in a spaced apart relation to the bottom of the base pot when the male pot is inserted into the open top 48 of the base pot.

Figure 3:
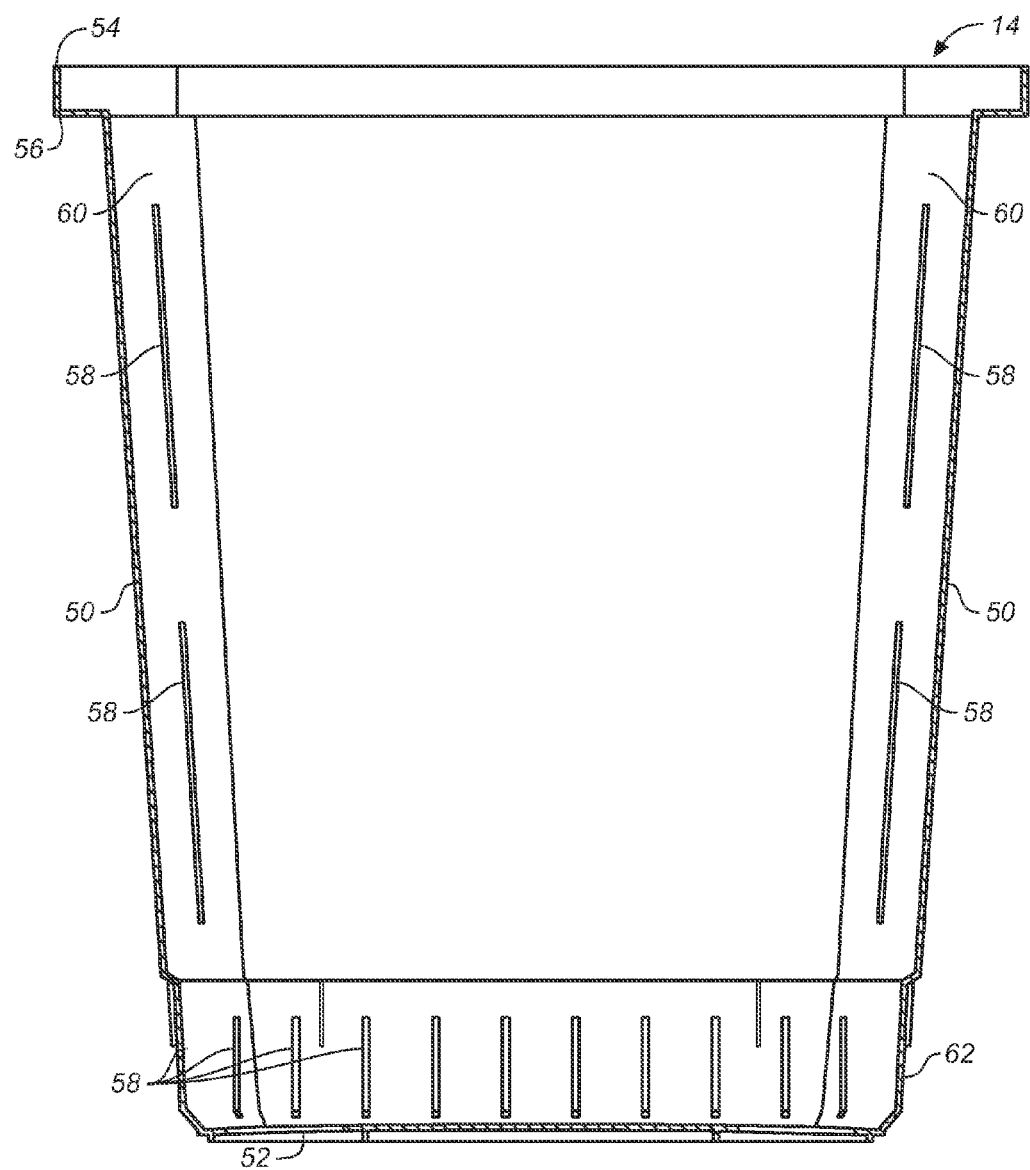
FIG. 3 is a cross-sectional side view in elevation of the insert pot take along section lines 3-3 of FIG. 6.
Figure 5:
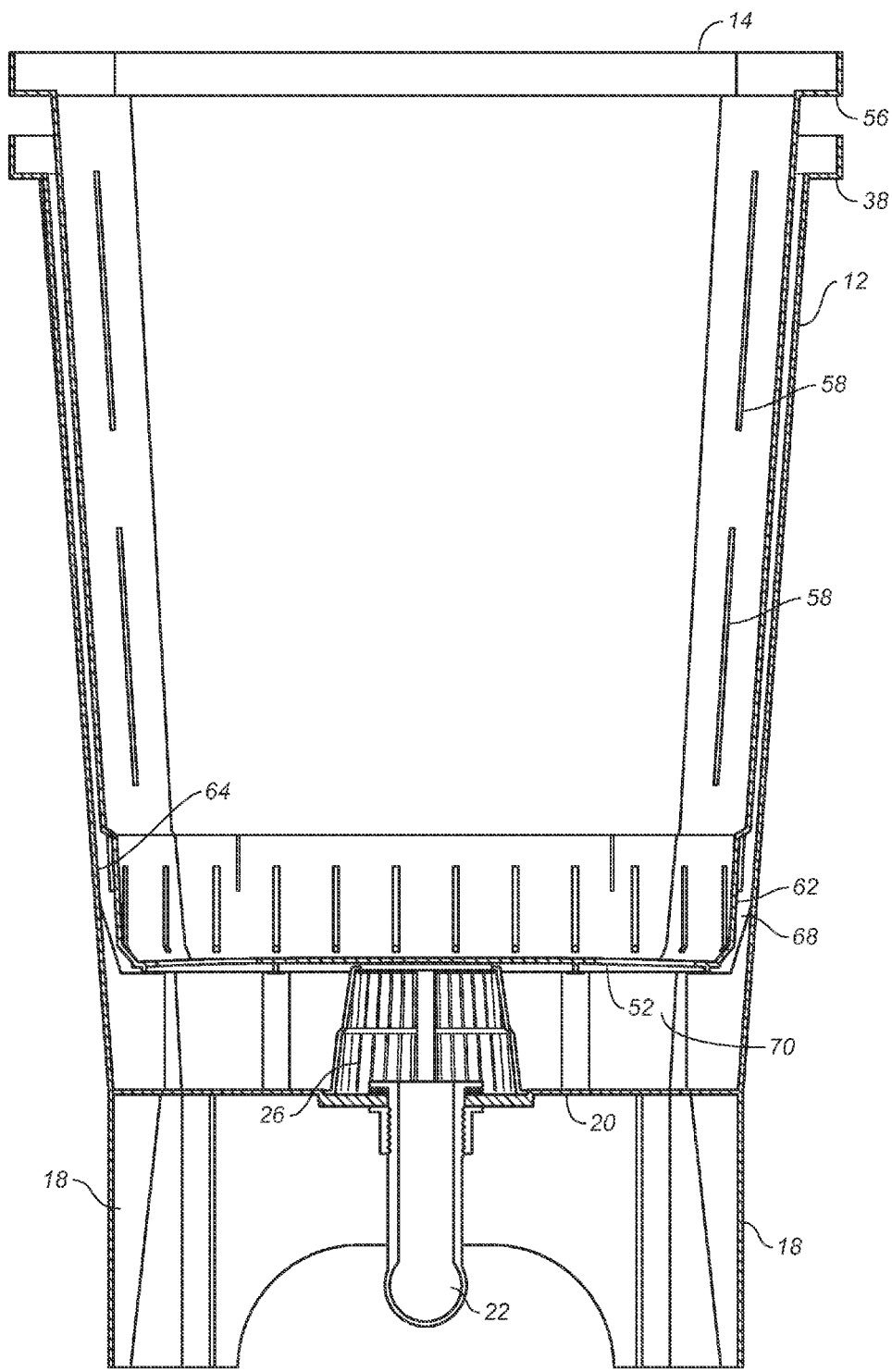
FIG. 5 is a cross-sectional rear view in elevation of the insert pot nested in the base pot.
Figure 6:
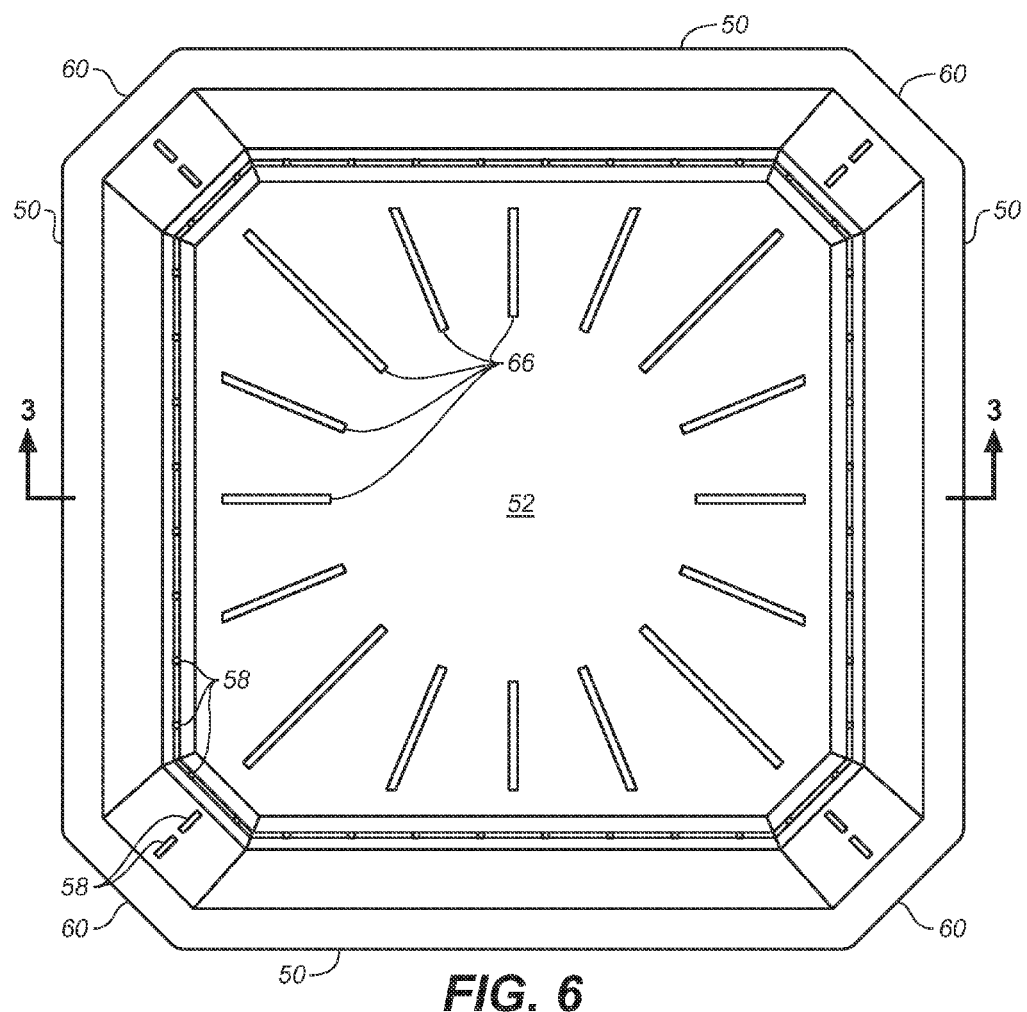
FIG. 6 is a top plan view of the insert pot.

Referring still to FIGS. 1 and 2, and now also to FIGS. 3 and 6, there is shown the insert (male) pot 14 of the present invention. The insert pot conforms in shape with that of the base pot though, including the geometry and tapering of the sides 50 geometry and side tapering, though with slightly smaller overall dimensions so as to allow a full insert into the base pot such that the bottom 52 of the male pot rests on the stand offs 44 of the base pot. The upper edge 54 also includes a curled edge 56 for gripping, and when the bottom 52 of the insert pot is disposed on the stand offs in the base pot, the curled edges 38 and 56 are slightly spaced apart, making manual separation of the pots easier (see FIGS. 1 and 5).

The insert pot further includes drain slots 58, preferably vertically oriented, and disposed along both the truncated side portions 60 and a basin portion 62, the latter which has a slightly smaller circumferential dimension than the interior side 64 of the base pot in the region immediately surrounding the basin portion of the insert pot when the insert pot is disposed in the base pot. The bottom of the insert pot also includes drain slots 66. As shown in FIG. 5, the spaces 68, 70, respectively, between the basin portion and the side of the base pot and the bottom 52 of the insert pot and the bottom 20 of the base pot provides room for drainage of water from the insert pot to the base pot. That water then passes through the basket strainer, through the connector Tee and into the drain line. The drain line can be coupled to a common drain line or lines connected to other nested pot combinations.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A double-walled nested plant pot assembly, comprising:
   a base pot including a bottom and a plurality of sides tapering inwardly from top to bottom and defining an interior volume, and further including an open top, a drain hole in said bottom, and supports disposed on said bottom for elevating said bottom above a surface on which said base pot is placed and providing at least one clearance for a drain pipe to be disposed under said bottom;
   a pipe fitting disposed in said drain hole for connection with a drain line;
   support elements disposed proximate said bottom for supporting an insert pot inserted into said base pot, wherein said support elements comprise stand offs having generally coplanar shelf portions; and
   an insert pot generally conforming in shape with that of said base pot, said insert pot having tapering sides and a bottom for placement on said support elements of said base pot, said insert pot sides and bottom having a plurality of drain slots in fluid communication with said interior volume of said base pot; and a basket strainer disposed over said drain hole and interposed between said base pot bottom and said insert pot bottom; wherein each of said base pot and said insert pot include a curled upper edge to facilitate handling, such that when said insert pot is inserted in said base pot and placed on said stand offs, said curled upper edge of said base pot is spaced apart from said curled upper edge of said insert pot.

2. The plant pot assembly of claim 1, wherein said insert pot includes a basin portion having a circumferential dimension smaller than the interior circumferential dimension of said base pot interior side proximate said basin portion when said insert pot is positioned on said support elements, and said basin portion includes a plurality of dram slots.

3. The plant pot assembly of claim 1, wherein said supports comprise legs integral with said bottom of said base pot.

4. The plant pot assembly of claim 1, wherein each of said base pot and said insert pot are substantially square in cross-section as viewed in a top plan view.

5. The plant pot assembly of claim 1, wherein each of said base pot and said insert pot includes truncated corners joining each side.

6. The plant pot assembly of claim 1, further including an overhead irrigation system for introducing irrigation water into said insert pot.

7. The plant pot assembly of claim 1, further including a drain pipe coupled to said drain hole, and wherein irrigation water supplied by an overhead drip line drains from said insert pot into said base pot through a basin drain, and through said drain pipe into a water supply and circulation system.

\* \* \* \* \*